US009702365B2

United States Patent
Rosinski et al.

(10) Patent No.: US 9,702,365 B2
(45) Date of Patent: Jul. 11, 2017

(54) ANTI-SURGE SPEED CONTROL

(71) Applicants: Andrew C. Rosinski, Orchard Park, NY (US); Paul W. Belanger, Clarence Center, NY (US); Michael S. Manning, Buffalo, NY (US)

(72) Inventors: Andrew C. Rosinski, Orchard Park, NY (US); Paul W. Belanger, Clarence Center, NY (US); Michael S. Manning, Buffalo, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 1072 days.

(21) Appl. No.: 13/888,943

(22) Filed: May 7, 2013

(65) Prior Publication Data

US 2013/0323014 A1 Dec. 5, 2013

Related U.S. Application Data

(63) Continuation-in-part of application No. 13/484,846, filed on May 31, 2012, now abandoned.

(51) Int. Cl.
| | | |
|---|---|---|
| *F04D 15/00* | (2006.01) | |
| *B01D 53/047* | (2006.01) | |
| *F04D 27/02* | (2006.01) | |

(52) U.S. Cl.
CPC ..... *F04D 15/0066* (2013.01); *B01D 53/0476* (2013.01); *F04D 27/0261* (2013.01);
(Continued)

(58) Field of Classification Search
CPC ............ F04D 15/0066; F04D 27/0261; B01D 53/0476; B01D 53/0446; B01D 2251/302;
(Continued)

(56) References Cited

U.S. PATENT DOCUMENTS 5,306,116 A 4/1994 Gunn et al.
5,347,467 A * 9/1994 Staroselsky ......... F04D 27/0269
415/1

(Continued)

FOREIGN PATENT DOCUMENTS

WO  WO 2009/120654 A1  10/2009

OTHER PUBLICATIONS

GMRC Guideline—Release Version 4.3, Application Guideline for Centrifugal Compressor Surge Control Systems; Apr. 2008; Gas Machinery Research Council Southwest Research Institute; GMRC, Gas Machinery Research Council est. 1952; pp. 1-73.

*Primary Examiner* — Dwayne J White
*Assistant Examiner* — Adam W Brown
(74) *Attorney, Agent, or Firm* — Ralph J. Mancini

(57) ABSTRACT

The invention relates to a method and control system to control the speed of a centrifugal compressor operating within a vacuum pressure swing adsorption process to avoid an operation at which surge can occur and directly driven by an electric motor that is in turn controlled by a variable frequency drive. The claimed method determines the optimal speed for operation of the compressor along a peak efficiency operating line of a compressor map thereof. Speed of the compressor is adjusted by a feed back speed multiplier when the flow or other parameter referable to flow through the compressor is below a minimum and a feed forward multiplier during evacuation and evacuation with purge steps that multiplies the feed back multiplier to increase speed of the compressor and thereby avoid surge.

20 Claims, 6 Drawing Sheets

(52) U.S. Cl.
CPC .. *B01D 2251/302* (2013.01); *B01D 2253/112* (2013.01); *B01D 2256/10* (2013.01); *B01D 2256/12* (2013.01); *B01D 2256/16* (2013.01); *B01D 2256/18* (2013.01); *B01D 2256/22* (2013.01); *B01D 2257/102* (2013.01); *B01D 2258/06* (2013.01); *B01D 2259/401* (2013.01); *B01D 2259/402* (2013.01); *B01D 2259/40007* (2013.01)

(58) Field of Classification Search
CPC .......... B01D 2253/112; B01D 2256/10; B01D 2256/12; B01D 2256/16; B01D 2256/18; B01D 2257/102; B01D 2258/06; B01D 2259/40007; B01D 2259/401; B01D 2259/402
USPC ........................... 95/109, 113, 114, 128, 127
See application file for complete search history.

(56) References Cited

U.S. PATENT DOCUMENTS

| | | |
|---|---|---|
| 5,555,749 A | 9/1996 | Wehrman et al. |
| 5,873,257 A * | 2/1999 | Peterson ............. F04D 27/0261 62/129 |
| 6,599,093 B2 | 7/2003 | Totsuka |
| 7,094,019 B1 | 8/2006 | Shapiro |
| 7,785,405 B2 | 8/2010 | Manning et al. |

* cited by examiner

ANTI-SURGE SPEED CONTROL

RELATED APPLICATIONS

This application is a Continuation-In-Part of U.S. patent application Ser. No. 13/484,846, filed on May 31, 2012, which is incorporated herein by reference.

FIELD OF THE INVENTION

The present invention provides a method and control system for controlling the speed of a centrifugal compressor operating within a vacuum pressure swing adsorption apparatus and directly driven by an electric motor to avoid the compressor from entering surge. More particularly, the present invention relates to such a method and system in which the speed is increased during at least those steps of a repeating cycle conducted by the vacuum pressure swing adsorption apparatus where the compressor may encounter surge and in amounts of increase that vary in accordance with the steps being conducted.

BACKGROUND OF THE INVENTION

In a vacuum pressure swing adsorption process one or more adsorbents are used to adsorb one or more components of a feed stream and thereby produce a purified product stream. A typical process has a series of continuously executed steps in accordance with a repeating cycle. In the repeating cycle, an adsorbent bed containing the adsorbent is alternately used to produce the purified product and then is regenerated. During regeneration, the adsorbed components are desorbed from the adsorbent and then, the adsorbent bed is brought back into state in which it can be brought back on line and producing the product.

In a typical vacuum pressure swing adsorption process designed to make product oxygen from feed air, an adsorbent bed is subject to a seven step process conducted in the repeating cycle. For purposes of illustration only, such an adsorption process can be conducted with one bed. In a first step, the bed is simultaneously pressurized from the bottom with feed air and from the top with equalization gas delivered from a recovery tank. Thereafter, high purity product is added to the top of the bed from the oxygen surge tank while feed air is supplied by a compressor or other blower such as a Roots type of blower. In a third step, the bed continues to be pressurized from the bottom via the blower. The bed is now ready to make product and feed air is fed into the bottom of the vessel and product is removed from the top. The product gas is delivered to the oxygen surge tank. After production is complete, the blower is unloaded and the lower purity gas remaining in the top of the pressurized bed is transferred to the recovery tank. In a subsequent evacuation step, waste nitrogen is removed from the bottom of the vessel through the centrifugal compressor while there is no flow exiting or entering the top of the vessel. In the last step, the centrifugal compressor continues to remove nitrogen from the bottom of the vessel while oxygen purge gas is added to the top of the vessel. The pressure remains relatively constant during this step due to the fact that the oxygen purge flow is controlled equal to the evacuation flow. As would be known in the art, such a process could be carried out in multiple beds in which each bed is subjected to the steps outlined above.

As disclosed in U.S. Pat. No. 7,785,405, centrifugal compressors directly driven by direct drive high-speed permanent magnet motors have been advantageously utilized in vacuum pressure swing adsorption processes. The use of such motors allow for variable-speed operation such that the compressor and high-speed permanent magnet motor combination(s) can accelerate from low-speed to high-speed and decelerate from high-speed to low-speed rapidly, as required by the process. It has been found that this offers a major improvement over the use of centrifugal compressors driven by conventional induction motor/gearbox systems which due to the high inertia of the induction motor cannot accelerate and decelerate quickly. By continuously varying the compressor speeds to match the pressure ratio requirement for the compressor, which is varying because of the pressurizing and evacuating adsorbent beds, the centrifugal compressor used in such a cycle can be operated near, and preferably at, its peak efficiency from 100% design speed to a substantially lower speed.

Compressors are designed to operate within an operating envelope that can be plotted in what is referred to as a compressor map of pressure ratio between outlet pressure and inlet pressure versus flow rate through the compressor. On such a plot, a peak or best efficiency operating line is plotted in which for a given flow rate and pressure ratio, the energy consumption of the compressor is at a minimum. This compressor map can be programmed within a controller used in controlling the speed of the motor and therefore, the compressor. Depending upon the specific step in the vacuum pressure swing adsorption process, which would require a specific pressure ratio across the centrifugal compressor, the controller sends a signal referable to the optimal speed as determined from the compressor map to a variable speed drive that controls the speed of the high-speed permanent magnet motor.

There are, however, situations that can cause the compressor to move off the peak efficiency operating line and into a surge condition. For instance, there can be a lag in the control system, transitional steps in the process being conducted by the vacuum pressure swing adsorption apparatus, changes in ambient conditions and transitioning off the minimum speed line. In all of such situations, the mass flow being compressed can fall for a given speed and pressure ratio to drive the compressor into surge. A surge event is therefore, produced by a flow rate through the compressor falling below a minimum flow required at a given speed of the impeller of the compressor that is necessary to maintain stable operation. In a surge event, the head pressure developed by the compressor decreases causing a reverse pressure gradient at the compressor discharge and a resulting backflow of gas. Once the pressure in the discharge line of the compressor drops below the pressure developed by the impeller, the flow reverses once again. This alternating flow pattern has been found to be an unstable condition that can result in serious damage to the compressor impeller, drive mechanism and components. This condition must be avoided.

In repeating cycles employed in vacuum pressure swing adsorption apparatus, the operational conditions of the compression at which surge can occur will be most critical at high speeds. Additionally, during the evacuation and purge steps and particularly during the transition between the purge and evacuation steps, surge can occur quite unexpectantly. As will be discussed, the present invention provides a speed control that is particularly designed to avoid surge during low speed operation and during the evacuation and purge steps and the transition between such steps.

SUMMARY OF THE INVENTION

The present invention provides a method of controlling the speed of a centrifugal compressor operating within a vacuum pressure swing adsorption apparatus. The centrifugal compressor is directly driven by an electric motor controlled by a variable frequency drive. In this regard, the term "electric motor" as used herein and in the claims means either a high speed permanent magnet motor or a high speed induction motor. In connection with such method, a parameter referable to a flow rate of gas entering the centrifugal compressor is measured and calculated. The pressure ratio of outlet to inlet pressure of the compressor is also measured and calculated. An optimal speed of the centrifugal compressor is determined based on the pressure ratio and that lies along the peak efficiency operating line of the centrifugal compressor. Additionally, a minimum allowable value of the parameter at which the centrifugal compressor is likely to enter surge conditions at the optimal speed is also determined. A feed back multiplier is determined that when multiplied by the optimal speed will either increase the speed when the parameter is less than the minimum allowable value or will reduce the speed when the parameter is greater than or equal to the minimum allowable value.

During steps of a repeating cycle conducted by the vacuum swing adsorption apparatus where the centrifugal compressor is at least likely to encounter surge conditions, other than a pure evacuation step and an evacuation with product purge step thereof, a total speed multiplier is set equal to the feed back multiplier. During the pure evacuation step and the evacuation with product purge step, the total speed multiplier is calculated by multiplying the feed back multiplier by a feed forward multiplier that will increase the speed during the evacuation step and the evacuation with purge step such that centrifugal compressor is not likely to enter the surge conditions. An adjusted speed is calculated at such time by multiplying the optimal speed by the total speed multiplier. A control signal referable at least to the adjusted speed is generated and inputted into the variable frequency drive such that the electric motor and therefore, the centrifugal compressors operates at the adjusted speed. It is to be noted that as used herein and in the claims, the term "pure evacuation step" means a step of the vacuum pressure swing adsorption process in which an adsorbent bed is being evacuated from the bottom of the adsorption bed and valves are set so that no gas is either being introduced into the adsorbent bed or released from the top of the of the adsorption bed. Further, as used herein and in the claims, the term, "evacuation with product purge step" means a step of the vacuum pressure swing adsorption process in which an adsorbent bed is subjected to evacuation at the bottom of the adsorption bed and the introduction of product gas, for instance oxygen, into the top of the bed.

The anti-surge speed control method and system as discussed above and set forth in the claims is equally applicable to apparatus in which a single compressor serves to feed compressed gas to an adsorption bed and evacuate an adsorption bed during the regeneration thereof or where a feed compressor is used for feeding compressed gas to adsorption beds of the apparatus and an evacuation compressor is used in evacuating gases from the adsorption beds. In this regard, where an evacuation compressor is used, it will be a centrifugal compressor that utilizes the above strategy of anti-surge control. The feed compressor may not in such apparatus be a centrifugal compressor and as such, would not be subjected to such anti-surge control. As will be discussed, where the feed compressor is a centrifugal compressor, elements of the anti-surge speed control can be used for the control thereof.

It is understood that generally speaking, the present invention contemplates that the total speed multiplier is set equal to the feed back multiplier where the centrifugal compressor is at least likely to encounter surge conditions, other than in the pure evacuation step and the evacuation with product purge step thereof. The present invention specifically contemplates, at points within the repeating cycle where surge conditions are unlikely to be encountered, the control signal that is inputted into the variable frequency drive will have the effect of removing power from the electric motor. In this regard, the vacuum pressure swing adsorption process can use a single compressor to feed compressed gas to an adsorbent bed and to evacuate gases from the adsorbent bed. In such case, the repeating cycle can include a feed with equalization step subsequent to the evacuation with product purge step, a feed with product repressurization step following the feed with equalization step and an equalization step prior to the pure evacuation step. During the feed with equalization step, the equalization step and initiation of the feed with product repressurizaton step, the control signal is referable to a non-operational speed such that when the control signal is inputted into the variable frequency drive, electrical power is not applied to the electric motor. However, when a predetermined pressure ratio of the pressure ratio is obtained during the feed with product repressurization step, the control signal is again referable to the adjusted speed such that the electric motor and therefore, the compressor operates at the adjusted speed. It is to be noted, however, that the present invention also contemplates and intends to cover within the appended claims an embodiment in which in steps of the repeating cycle, other than the pure evacuation step and the evacuation with product purge step, the total speed multiplier is always set equal to the feed back multiplier and the control signal is always referable to the adjusted speed. Furthermore, in a multi-adsorbent bed apparatus that uses dedicated feed and evacuation compressors, the repeating cycle can include a falling pressure equalization step and a rising pressure equalization step subsequent to the evacuation with product purge step. During the falling pressure equalization step and the rising pressure equalization step, the control signal is referable to a non-operational speed such that electrical power is not applied to the electric motor driving with the evacuation compressor. When a predetermined pressure ratio is obtained during the falling pressure equalization step, the control signal is again set referable to the adjusted speed such that the evacuation compressor operates at the adjusted speed.

Each time the feed back multiplier is determined, the feed back multiplier can be stored. When the parameter is less than the minimum allowable value, the feed back multiplier is determined by adding to a last stored value of the feed back multiplier a speed correction factor. When the parameter is greater than or equal to the minimum allowable value, the feed back speed multiplier is calculated by dividing the last stored value of the feed back multiplier by a proportionality constant. The proportionality constant is set equal to a value greater than 1.0 when the last stored value of the feed back multiplier is greater than or equal to 1.0 or 1.0 when the last stored value of the feed back multiplier is less than 1.0.

The feed forward multiplier can be a function of the pressure ratio. The function can have a maximum value of the feed forward multiplier at a predetermined pressure ratio at which or directly before which the centrifugal compressor will likely enter surge conditions during a transition between the evacuation step and the purge step. The function will have decreasing values of the feed forward multiplier at pressure ratios greater than or less than maximum value. The maximum value has a magnitude preselected such that when the maximum value is multiplied by the optimal speed at the predetermined pressure ratio the resulting speed will prevent the centrifugal compressor from entering surge conditions. The function can be a Gaussian function.

The parameter can be a pressure difference measured at two points in the shroud of the centrifugal compressor that are successively closer to an impeller thereof. During each of the time intervals, a pressure difference error is calculated and stored by subtracting the minimum allowable value from the a current value of the pressure difference. The speed correction factor of the feed back multiplier is calculated during each of the time intervals through proportional integral control comprising adding a proportional term to an integral term, the proportional term calculated by multiplying a gain factor by a difference between the pressure difference error and a prior pressure difference error calculated in a prior time interval and dividing the difference by the time interval. The integral term is calculated by dividing the gain factor by an integral reset time and multiplying a resultant quotient thereof by the pressure difference error.

The present invention also provides a control system for controlling speed of a centrifugal compressor operating within a vacuum pressure swing adsorption apparatus and is directly driven by an electric motor controlled by a variable frequency drive. The control system is provided with means for sensing a parameter referable to a flow rate of gas entering the centrifugal compressor. Pressure transducers are positioned to sense pressure at an inlet and an outlet of the centrifugal compressor.

A controller is provided that is responsive to the parameter sensing means, the pressure transducers and steps of a repeating cycle conducted by the vacuum pressure swing adsorption apparatus. The controller has a control program that is programmed to calculate a pressure ratio of the pressures of the outlet to inlet of the centrifugal compressor. The control program also determines an optimal speed of the centrifugal compressor based on the pressure ratio and that lies along the peak efficiency operating line of the centrifugal compressor. A minimum allowable value of the parameter at which the centrifugal compressor is likely to enter surge conditions at the optimal speed is determined by the controller along with a feed back multiplier that when multiplied by the optimal speed will either increase the speed when the parameter is less than the minimum allowable value or will reduce the speed when the parameter is greater than or equal to the minimum allowable value. A total speed multiplier is set equal to the feed back multiplier during the steps of the repeating cycle where the centrifugal compressor is at least likely to enter surge conditions, other than a pure evacuation step and an evacuation with product purge step thereof. The total speed multiplier is set equal to a mathematical product of the feed back multiplier and a feed forward multiplier during the pure evacuation step and the evacuation with product purge step, that will increase the speed such that centrifugal compressor is not likely to enter surge conditions. An adjusted speed is calculated by multiplying the optimal speed by the total speed multiplier.

The controller is configured to generate a control signal in response to the control program and able to serve as an input into the variable frequency drive such that speed of the electric motor and therefore, the centrifugal compressor is controlled in response to the control signal. The control signal referable at least to the adjusted speed such that the electric motor and therefore, the centrifugal compressor operates at the adjusted speed.

As indicated above, the system is applicable to a vacuum pressure swing adsorption apparatus that utilizes a feed compressor for feeding compressed gas to adsorption beds of the vacuum pressure swing adsorption apparatus and an evacuation compressor used in evacuating gases from the adsorption beds. In such case, the evacuation compressor is formed by the centrifugal compressor. Another centrifugal compressor may or may not be used in forming the feed compressor.

The vacuum pressure swing adsorption apparatus can use a single compressor to feed compressed gas to an adsorbent bed and to evacuate gases from the adsorbent bed. In such case, the repeating cycle can include a feed with equalization step subsequent to the evacuation with product purge step, a feed with product repressurization step following the feed with equalization step and an equalization step prior to the pure evacuation step. The control program can be programmed to produce a non-operational speed at which the variable frequency drive will remove electrical power from the electric motor and the control signal is referable to the non-operational speed when produced by the control program. During the feed with equalization step, the equalization step and initiation of the feed with product repressurizaton step, the control program produces the non-operational speed such that when the control signal is inputted into the variable frequency drive, electrical power is not applied to the electric motor. The control program also programmed such that when a predetermined pressure ratio of the pressure ratio is obtained during the feed with product repressurization step, the control signal is again referable to the adjusted speed such that the electric motor and therefore, the compressor operates at the adjusted speed. In case of a vacuum pressure swing adsorption apparatus that uses a dedicated evacuation compressor, the repeating cycle can include a falling pressure equalization step and a rising pressure equalization step subsequent to the evacuation with product purge step. The control program in such case is programmed to produce a non-operational speed at which the variable frequency drive will remove electrical power from the electric motor and the control signal is referable to the non-operational speed when produced by the control program. During the falling pressure equalization step and the rising pressure equalization step, the control program produces the non-operational speed such that when the control signal is inputted into the variable frequency drive, electrical power is not applied to the electric motor driving the evacuation compressor. The control program is also programmed such that when a predetermined pressure ratio of the pressure ratio is obtained during the falling pressure equalization step, the control signal is again referable to the adjusted speed such that the electric motor and therefore, the evacuation compressor operates at the adjusted speed.

The control program can be programmed such that each time the feed back multiplier is determined, the feed back multiplier is stored. In accordance with such programming, when the parameter is less than the minimum allowable value, the feed back multiplier is determined by adding to a last stored value of the feed back multiplier a speed correction factor. When the parameter is greater than or equal to the minimum allowable value, the feed back speed multiplier is determined by dividing the last stored value of the feed back multiplier by a proportionality constant. The proportionality constant is set equal to a value greater than 1.0 when the last stored value of the feed back multiplier is greater than or equal to 1.0 or 1.0 when the last stored value of the feed back multiplier is less than 1.0.

The control program can also be programmed such that the feed forward multiplier is a function of the pressure ratio. Such function has a maximum value of the feed forward multiplier at a predetermined pressure ratio at which or directly before which the centrifugal compressor will likely enter surge conditions during a transition between the evacuation step and the purge step. The feed forward multiplier has decreasing values of the feed forward multiplier at pressure ratios greater than or less than maximum value. The maximum value has a magnitude preselected such that when the maximum value is multiplied by the optimal speed at the predetermined pressure ratio the resulting speed will prevent the centrifugal compressor from entering surge conditions. The function can be a Gaussian function.

The parameter sensing means can include two further pressure transducers situated at two points in the shroud of the centrifugal compressor that are successively closer to an impeller thereof. In such case, the control program is programmed to calculate a pressure difference from pressure measured by the two further pressure transducers. The parameter is the pressure difference. In such case, the control program can be programmed such that during each of the time intervals, a pressure difference error is calculated and stored by subtracting the minimum allowable value from the current value of the pressure difference. The speed correction factor of the feed back multiplier is calculated during each of the time intervals through proportional integral control comprising adding a proportional term to an integral term. The proportional term calculated by multiplying a gain factor by a difference between the pressure difference error and a prior pressure difference error calculated in a prior time interval and dividing the difference by the time interval. The integral term can be calculated by dividing the gain factor by an integral reset time and multiplying a resultant quotient thereof by the pressure difference error.

BRIEF DESCRIPTION OF THE DRAWINGS

While the specification concludes with claims distinctly and particularly pointing out the subject matter that Applicants regard as their invention, it is believed that the invention will be better understood when taken in connection with the accompanying drawings in which:

DETAILED DESCRIPTION

Figure 1:
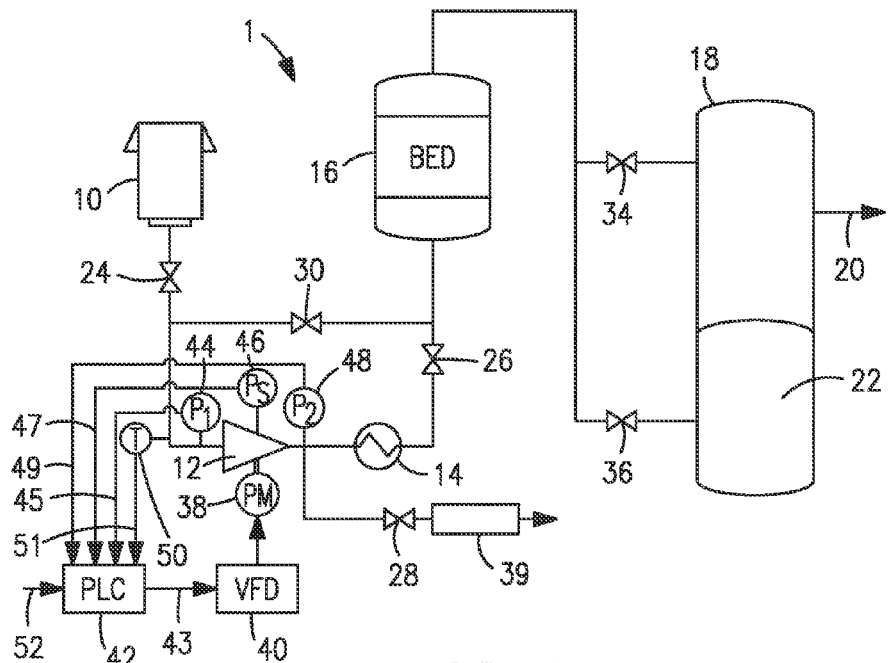
FIG. 1 is a schematic diagram of a vacuum pressure swing adsorption apparatus for conducting a process in accordance with the present invention.

With reference to FIG. 1, a vacuum pressure swing adsorption apparatus 1 is illustrated that is designed to produce an oxygen product. Although vacuum pressure swing adsorption apparatus 1 is a single bed design, it is understood that this is for purposes of illustration and the present invention would have equal applicability to a multiple bed design using a single or multiple compressors designed to pressurize and evacuate an adsorbent bed or beds. Furthermore, the present invention is equally applicable to vacuum pressure swing adsorption apparatus designed to produce other products such as carbon dioxide, nitrogen, hydrogen or helium. As such, the vacuum pressure swing adsorption apparatus 1 is shown and described herein for exemplary purposes only.

Vacuum pressure swing adsorption apparatus 1 draws air through an inlet 10 that contains a filter to filter out particulates. The resulting air feed stream is drawn by a compressor 12 having an after cooler 14 to remove the heat of compression. The resulting compressed feed stream is introduced into an adsorbent bed 16 that can contain well known LiX adsorbents to produce an oxygen product that is introduced into an oxygen surge tank 18 from which an oxygen product stream 20 can be drawn. It is to be noted that compressor 12 is directly driven by a variable speed permanent magnet motor 38 in which the speed is controlled by a variable frequency drive 40 to be discussed in which an adjusted speed signal is generated by a controller 42, the "PLC", also to be discussed. In this regard, as indicated above, the present invention also has applicability to high speed induction motors.

The adsorbent bed 16 is subjected to a repeating cycle in the production of the oxygen product stream that has seven steps. In a first of the steps, a feed with equalization step is conducted in which the adsorption bed 16 is simultaneously pressurized from the bottom with the feed air and with the use of the compressor 12 and from the top with equalization gas delivered from a recovery tank 22. In order to accomplish this, valves 24 and 26 are set in open positions, valves 28, 30 and 34 are set in closed positions and a valve 36 is set in a partially open position. With additional reference to FIG. 2, it can be seen that the speed of compressor 12 is falling due to deceleration from a final step seven to be discussed hereinafter. It is to be noted that in FIG. 2, the step number indicates the end of a particular step. In any case, the purpose of such step is to allow the adsorbent bed 16 to be gradually brought up to an operational pressure.

At the conclusion of Step 1, Step 2 is initiated, a feed with product pressurization step, by closing valve 36 and partially opening valve 34. During this step, high purity product is now being supplied to the adsorbent bed 16 from the oxygen surge tank 18 while the adsorbent bed 16 is pressurized from the bottom with the use of the compressor 12. As can best been seen from FIG. 2, the adsorbent bed 16 at the conclusion of step 2 has been brought up to an operational pressure at which adsorption is commenced in a step 3. During step 2, the compressor speed begins to rise from a minimum as the pressure increases.

In step 3, a feed only step, valves 28, 30, 34 and 36 are now set in closed positions while the adsorbent bed is further pressurized by the compressor 12 to cause nitrogen to be adsorbed within the adsorbent bed 16. During step 3, the speed of the compressor is gradually increased as is the pressure within the adsorbent bed 16. Step 3 is followed by a feed and production step 4 in which the speed of the compressor 12 is increasing as is the pressure within the adsorbent bed 16. During step 4, valve 34 opens and oxygen product flows into the oxygen surge tank 18.

After production, the adsorbent bed is regeneratated in a series of steps that begins with a step 5 that constitutes an equalization step. Step 5, the equalization step, begins with the compressor 12 in an unpowered state and as such the speed of the compressor 12 begins to fall along with the pressure within the adsorbent bed. Equalization gas is vented from the top of the adsorbent bed 16 to recovery tank 22 by partially opening valve 36. At the conclusion of step 5, step 6 is commenced, a pure evacuation step, in which the adsorbed bed begins to be evacuated by closing valve 36 and opening valves 28 and 30. The compressor now is acting as a vacuum pump and is removing waste nitrogen from the adsorbent bed 16 and discharging the waste nitrogen through vent silencer 39. At step 7, evacuation continues with an oxygen purge by partially opening valve 36. This is referred to herein and in the claims as the evacuation with product purge step. From step 7, the cycle is continued by commencing step 1 by opening the valves as described above.

The foregoing operation of vacuum pressure swing adsorption system is conventional. However, for reference, the following Table indicates the valve positioning during each of the steps 1-7 outlined above.

TABLE

|  |  | STEP | | | | | | |
|---|---|---|---|---|---|---|---|---|
|  |  | 1 | 2 | 3 | 4 | 5 | 6 | 7 |
| VALVE NUMBER | 24 | O | O | O | O | O | C | C |
|  | 28 | C | C | C | C | O | O | O |
|  | 26 | O | O | O | O | C | C | C |
|  | 30 | C | C | C | C | C | O | O |
|  | 34 | C | P | C | O | C | C | C |
|  | 36 | P | C | C | C | P | C | P |

O = Open
C = Closed
P = Partially open

Although not illustrated, the valves would be controlled by a programmable logic controller that would be programmed to proceed from step to step on the basis of pressure and time For example, steps 1 and step 2 can be time based steps which conclude upon the elapse of a time intervals. The time periods of step 1 and step 2 are set to achieve desired pressures within the adsorbent bed 16 that will bring the adsorbent bed 16 up to an operational pressure at which adsorption will be conducted. Steps 3 and 4 can be pressure based and end when the bed pressure is at an adsorption pressure set point that is an optimal pressure for nitrogen adsorption of the adsorbent. Step 5 can again a time based step in which the time interval is set to achieve a desired low pressure within the adsorbent bed and send a desired about of gas to recovery tank 22 for later purge and equalization purposes. Step 6 is typically a pressure based step at which the optimal desorption pressure is obtained and step 7 is a time based step that is set to guarantee a sufficient desorption for regeneration of the adsorbent bed 16.

Although the present invention has been thus far described with reference to a single bed vacuum pressure swing adsorption process, it is equally applicable to a multiple bed process. As would be known to those skilled in the art, where a multiple bed process was conducted, in place of the recovery tank 22, equalization gas would be vented from one adsorbent bed and introduced into another adsorbent bed. Since the production would be continuous, the oxygen surge tank 18 would be of smaller volume than that used with the illustrated single bed apparatus and process.

In accordance with the present invention, the speed of compressor 12 is controlled by varying the speed of a permanent magnet motor 38 by a variable frequency drive 40 that is responsive to a control signal 43 generated by a controller 42 that can be a programmable logic controller "PLC". It is understood that the controller 42 could be incorporated into the controller that is used in controlling the valve sequence shown in the Table above or could be a separate controller that is responsive to the valve sequence controller and in particular and for purposes that will be discussed, the exact step that is being executed by the valve sequence controller. The variable frequency drive 40 and the permanent magnet motor 38 can be obtained from a variety of known manufacturers and are readily available. It is to be noted that the present invention is equally applicable to high speed induction motors.

Controller 42 can be a Allen Bradley SLC 5/05 processer programmed with RSLogix 500 software or equivalent that can be obtained from Rockwell Automation located in Milwaukee, Wis., USA. The program within controller 42 continually executes during predetermined, repeating time intervals. Controller 42 is responsive to signals generated by pressure transducers 44, 46 and 48 and preferably a temperature transducer 50 and transmitted by suitable electrical connections 45, 47, 49 and 51, respectively. Additionally, a data input 52 is provided that serves as an input to the controller 42 containing the actual current step that the repeating cycle being conducted by the vacuum pressure swing adsorption apparatus 1. This data concerning the current step serves as in input to the control program that in a manner to be discussed responds to such data. Data input 52 can be obtained from the controller acting to control the valves in the repeating cycle being conducted by vacuum pressure swing adsorption apparatus 1.

Figure 3:
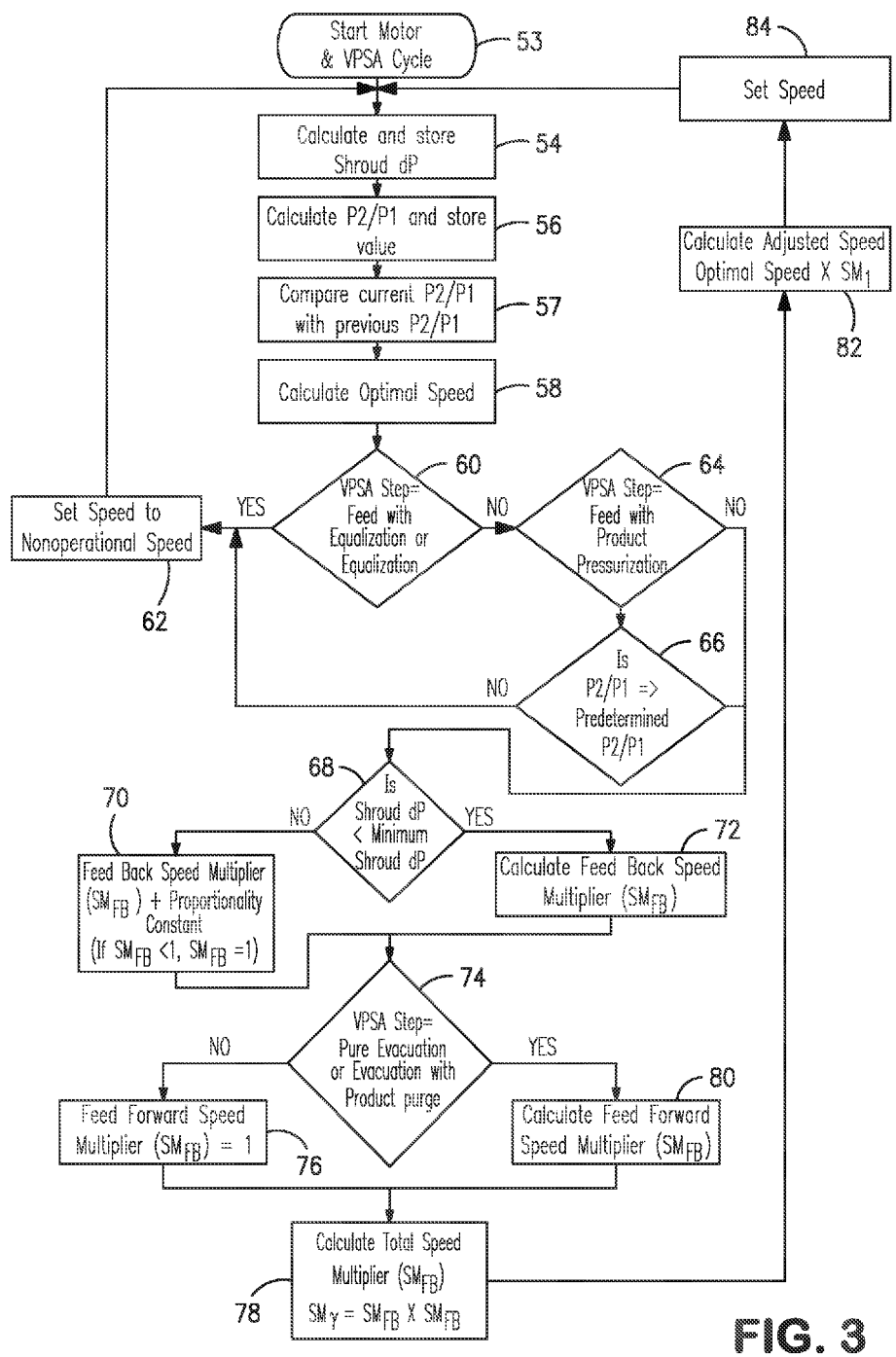
FIG. 3 is a logic diagram of speed control programming utilized in a controller employed in FIG. 1.

With reference to FIG. 3, the control logic is programmed within controller 42 by means of a control program. As a first stage of the programming, as illustrated by logic block 53, the motor 38 is started along with a repeating cycle conducted by the vacuum pressure swing adsorption apparatus 1 that has been described above with respect to the positioning of the valves. In starting the motor 38, it is set to run at a minimum speed which constitutes 40 percent of a design maximum speed. At above this speed, power begins to be applied to the motor. The variable frequency drive 40 is responsive to the control signal 43 generated by controller 42 to either control the permanent magnet motor 38 to run at an adjusted speed that will avoid surge or to cut power to the high speed permanent magnet motor 38 and thereby allow the permanent magnet motor 38 and therefore, the compressor 12 to decelerate when required in the repeating cycle.

After the first step 53, the controller then commences the continual execution over the predetermined, repeating time intervals which are each preferably less than 1 millisecond. In the step 54 a pressure difference "dP" is calculated at the shroud of the compressor 12 at two points or locations that are situated successively closer to the impeller or at the points measured by pressure transducers 46 and 48. This pressure difference, between the pressure measured by pressure transducers 48 and 46, respectively, provide a parameter that is referable to the flow passing through the compressor 12. In this regard, flow could be directly measured by a flow transducer. In the next logical stage of execution, designated by reference number 56, a pressure ratio across the compressor is calculated on the basis of the pressures measured by pressure transducer 48 and 44 or in other words, a ratio between outlet and inlet pressure and stored. Following the pressure ratio computation and storage, the current pressure ratio is compared with a previous value in step 57.

Figure 4:
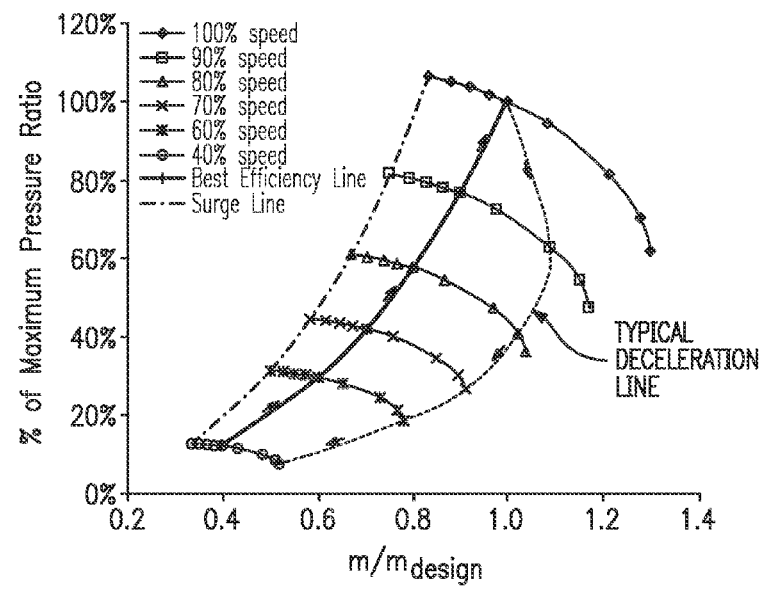
FIG. 4 is an exemplary curve of a compressor map illustrating the peak efficiency operating line graphed against pressure ratio versus mass flow through the compressor.

The optimal speed of the compressor 12 is determined from the pressure ratio calculated in logic block 54 that lies along the peak efficiency operating line. This is determined from compressor performance data for the particular compressor used. With reference to FIG. 4, an example of such data is set forth. The exact determination of this speed could be from a look up table or a polynomial equation in which the points of the peak efficiency operating line, referred to in the Figure as the "Best Efficiency Line", are fit in accordance with well known curve fitting techniques. It is understood that this curve will vary slightly based upon the temperature measured by temperature transducer 50. As such there would be data programmed within the control program that constitutes a family of such curves. Where temperature lies in an intermediate point, the exact speed could be interpolated between curves or multiplied by a correction factor equal to a ratio of the measured temperature to the design temperature from which an operating curve was derived. Alternatively, there could be a single curve that is based upon the expected temperature in which apparatus 1 operates. In such case, there would be no requirement for an input of temperature from temperature transducer 50. The lines crossing the peak efficiency operating line are specific speeds at which pressure ratio will vary with flow rate through the compressor. As is evident from the graph, at any particular speed, there exists a flow rate through the compressor 12 at which surge will occur.

After the optimal speed is calculated, execution step 60 is performed in which it is determined whether the vacuum pressure swing adsorption cycle is at the start of step 1 or step 5, namely, at the start of the feed with equalization or the equalization steps. This determination is made from data input 52. If at the start of such steps, then a non-operational speed is set by the programming, as indicated in step 62, and the control signal 43 will be referable to such non-operational speed. For instance, this speed could be 40 percent of the design maximum speed of the motor 38. The variable frequency drive 40 is in turn programmed or set up so that when the control signal 43 is referable to the non-operational speed, energy input to the motor 38 will be disabled, allowing the drive train (motor rotor and compressor impeller) to free-wheel decelerate or coast down to its minimum speed without consuming any power. In this regard, variable frequency drives 40 are typically set up to so function without any modification. This being said, it is equally possible to program the control program executing within controller 42 to generate a signal to control the power supply to the permanent magnet motor 38 to cut power when appropriate in the repeating cycle. With reference again to FIG. 4, the "Typical Deceleration Line" is the path the compressor follows when the repeating cycle conducted by the vacuum pressure swing adsorption apparatus 1 requires the compressor speed to decelerate due to falling head requirements. This is the case in step 1, part of step 2 and step 5.

Eventually, the drive train will have to power up during step 2 or in other words, the feed with product pressurization step. It begins with falling pressure. Consequently, at the initiation of step 2, the control signal 43 remains referable to the non-operational speed. However, with reference again to FIG. 2, pressure over a portion of such step begins to rise due to requirements of the repeating cycle and the application of power to the permanent magnet motor 38. In order to execute appropriate control to effectuate the foregoing operation, if the logic in step 60 is answered in the negative, then the program proceeds with execution of the test indicated in logic block 64 in which it is determined whether the step of the repeating cycle, the "VPSA Step" is at the feed with product pressurization, namely step 2, discussed above. Again this test is performed on the basis of the data input 52. If this test is answered in the affirmative, execution of the control program proceeds to execution of a further test shown in logic block 66 and the current pressure ratio "P2/P1", as measured by pressure transducers 48 and 44, is compared with a predetermined pressure ratio of "Predetermined P2/P1" which has previously being programmed within the control program. If the current pressure ratio is less than the predetermined pressure ratio, then again the program proceeds to the execution stage of the programming shown in block 62 and the permanent magnet motor 38 is allowed to continue to decelerate. As illustrated, where power to motor 38 is cut, the control program loops back to execution stage 54. If, however, the tests performed in the programming as set forth in logic blocks 60 and 64 are in the negative or the test performed in logic block 66 is in the affirmative, then the repeating cycle is not on steps 1 or 5 and is possibly in step 2 where power must be applied to the permanent magnet motor 38. At such point in the repeating cycle being conducted by vacuum pressure swing adsorption cycle, the compressor is being powered and therefore, there is a possibility or likelihood that surge conditions could be encountered in the operation of compressor 12. In order to avoid operation of compressor 12 where surge conditions could be encountered, the programming logic proceeds to the remainder of its execution starting with logic block 68.

In the execution of the programming as shown by logic block 68, the calculated pressure difference in logic block 54 "Shroud dP" is compared with a minimum dP. This minimum dP which is a value that is experimentally determined to be the minimum value over the entire cycle at which the compressor 12 will surge with a factor of safety. For instance, if compressor 12 will surge at any time during the repeating cycle conducted by the vacuum pressure swing adsorption apparatus 1 at a dP equal to 2 inches of water, the 2 inches of water is multiplied by 15 percent to obtain the minimum. An alternative to this is to determine at dP in step 58 along with the calculation of the optimal speed from the compressor map of the compressor as show as an exemplar in FIG. 4 to be discussed.

The execution of logic block 68 is a critical step because if the flow rate through the compressor is less than a minimum, then there exists a danger that the compressor 12 will enter surge. If, however, the calculated current pressure difference dP obtained in logic block 54 is greater than or equal to the minimum, there exists a lower probability of the compressor entering surge. In cases, however, that the calculated pressure difference from logic block 54 is not less than such minimum, as indicated in step 70 a feed back speed multiplier is calculated by dividing the last stored value of the feed back multiplier, "($SM_{FB}$")" that has been determined in a previous execution of the control program, by a proportionality constant. The proportionality constant is set equal to a value greater than 1.0, for instance 1.04 when the last stored value of the feed back multiplier is greater than or equal to 1.0. The exact value of such proportionality constant is determined through experimentation and can be considered as a tuning factor. When, however, the last stored value of the feed back multiplier is less than 1.0, the proportionality constant is simply set to 1.0. When such a feed back multiplier is multiplied by the optimal speed calculated in the execution stage illustrated by logic block 58, the effect of this will be to decrease speed slightly by use of the proportionality constant or to further decrease the speed by the factor of the last stored feed back multiplier when such last stored feed back multiplier is less than 1.0. If, however, the pressure difference measured in step 54 is less than the minimum pressure difference, then, as indicated in logic block 72, a new feed back multiplier will be calculated that will have the effect of increasing the speed. The calculation contemplated in logic block 72 is to add to a last stored value of the feed back multiplier, a speed correction factor. While such speed correction factor could be a constant, preferably, the speed correction factor contains proportional and integral terms. During each execution of the program, a pressure difference error is calculated and stored by subtracting the minimum allowable value from the current value of the pressure difference calculated in logic block 54. The proportional term is calculated by multiplying a gain factor by a difference between the pressure difference error and a prior pressure difference error calculated in a prior time interval or a prior execution of the control program and dividing the difference by the time interval. This prior pressure difference error is obtained from the stored value read from logic block 54 before calculation and storage of the current pressure difference error. The integral term is calculated by dividing the gain factor by an integral reset time and multiplying a resultant quotient thereof by the current pressure difference error.

The foregoing can be illustrated by the following equation:

$$SM_{FBi} = SM_{FBi-1} + K_c * \frac{(\varepsilon_i - \varepsilon_{i-1})}{t} + \frac{K_c}{\tau_I} * \varepsilon_i;$$

where: $SMFB_i$=Feed Back Speed Multiplier; $SMFB_{i-1}$=The previous stored value of the Feed Back Speed Multiplier, $K_c$ is the gain; $\varepsilon_i$ is the pressure difference error; $\varepsilon_{i-1}$ is the last stored value of the pressure difference error; $\tau_I$ is the integral reset time and t is the execution time interval of the control program. Thus, proportional-integral speed control is being exercised here and the "gain" and the "integral reset time" are simply known tuning factors that will be experimentally determined in a manner known in the art.

The program execution next proceeds to a step 74 in which the program tests where the current step of the repeating cycle conducted by the vacuum pressure swing adsorption apparatus 1 mentioned above is either in an evacuation or evacuation with purge step, or in other words, whether it is in steps 6 or 7 involving evacuation or evacuation with a product purge. If the vacuum pressure swing adsorption process is not in either of these steps, the a feed forward speed multiplier is set at 1.0 as indicated in the logic block of program designated by reference number 76 and a total speed multiplier is calculated in step 78 by multiplying the feed back speed multiplier determined in either steps 70 and 72 by 1.0. In other words, in such case, the total speed multiplier is equal to the feed back speed multiplier.

In case the test perform in logic block 74 is in the affirmative, then a feed forward speed multiplier is calculated in step 80 that will prevent surge during the evacuation or evacuation with purge steps and in particular at a point during the vacuum pressure swing adsorption cycle that lies near or at a transition between these two steps. While not well understood by the inventors herein, it has been found in practice that there exists a particular danger of the compressor 12 entering surge at that point of operation. In any case, with reference to FIG. 5, depending upon the current pressure ratio value calculated in step 56, a feed forward multiplier will be determined that is dependent upon such pressure ratio that will prevent surge. When this feed forward multiplier is multiplied by the feed back speed multiplier, the effect will be to increase the total speed multiplier calculated in step 76 over that which would be obtained from the feed back speed multiplier alone.

After the total speed multiplier has been calculated in step 78, an adjusted optimal speed is calculated in logic block 82 by multiplying the optimal speed calculated in step 58 by the total speed multiplier ("$SM_r$") to obtain an adjusted speed. This adjusted speed is then used to set the speed in the variable frequency drive 40 as shown in step 84. In this regard, the controller 42, in response to the value of the adjusted speed determined by the control program, generates the control signal 43 that is referable to such adjusted speed. This control signal 43 will then serve as an input that would revise the speed set in variable frequency drive 40. Another possibility would be for the variable frequency drive being programmed to read the output of adjusted speed that is generated by the controller 42. In any case, the programming proceeds to the next execution thereof after the elapse of the re-occurring execution time by looping back to execution step 54.

With reference again to FIG. 2, the strategy behind the speed control of the present invention is basically to obtain a speed based upon pressure ratio that will in most cases operate the compressor 12 upon its peak efficiency operating line shown in FIG. 3. Specifically, at the conclusion of the seventh step in the vacuum pressure swing adsorption process, the pressure ratio developed across the compressor 12 will be, in the embodiment described herein, about 2. The adsorbent bed will, however, be at a negative pressure. As, equalization gas flows into adsorption bed 16 from equalization tank 22, bed pressure rises rapidly from step 7 in which the bed has been evacuated to remove the nitrogen and conclude regeneration of the adsorbent. However, as far as the pressure ratio across the compressor 12 is concerned, during at least a portion of the pressure rise, power will be removed from the permanent magnet motor 38 and as shown, in FIG. 2, now power is being applied for part of the step and the speed of the compressor 12 is decelerating. During step 2, pressurization continues with product gas and a point is reached in which the pressure ratio as sensed by pressure transducers 48 and 44 increases due to the increase in bed pressure such that the speed of the compressor 16 must be increased to maintain operation along the peak efficiency operating line as shown in FIG. 3. During either of these steps, if the compressor 12 does not accelerate quickly enough the flow rate through the compressor as sensed by pressure transducers 46 and 44 may not be sufficient to avoid surge. In such case, this would be a situation in which an affirmative answer for the test in program execution block 68 would be in the affirmative and a feed back multiplier would be computed that necessarily increase the speed of the compressor to avoid surge. As steps 3 and 4 take place, the pressure ratio across the compressor increases due to the increase in bed pressure. The compressor therefore, speeds up to obtain the increase along the peak efficiency operating line. At such time, it is unlikely that the compressor will be at a mass flow anywhere near a condition at which surge would occur; and the inquiry in block 68 would be answered in the negative. This would result in a reduction of compressor speed back towards the peak efficiency operating line by either further reducing the feed back speed multiplier with the proportionality constant if the last value were 1.0 or greater or by reducing the speed further with the last value of the feed back speed multiplier.

After the conclusion of step 4, the adsorbent bed 16 needs to be regenerated. At this point gas is allowed to escape from the adsorbent bed 16 into the equalization tank 22. The pressure ratio falls rapidly and preferably, as described above, the variable frequency drive 40 reacts to the control signal 43 referable to the nonoperational speed produced in logic block 62 and ceases to apply power to the permanent magnet motor 38. Given that the motor is unloaded it is unlikely that a surge event would occur. However, at the beginning of the sixth step, the compressor 12 is acting as a vacuum pump and as the pressure decreases within adsorbent bed 16, the pressure ratio starts to rise. If the mass flow through the compressor is not sufficient, surge could occur. However, now an aggressive feed forward speed multiplier is calculated with the aid of FIG. 5. As the pressure ratio increases across the compressor as measured by pressure transducers 48 and 44, the feed forward speed multiplier increases to a peak value at a pressure ratio of about 1.7. This pressure ratio is experimentally determined to be that pressure ratio at which surge is likely to occur and the feed forward speed multiplier is selected to be that value that will sufficiently increase the speed of the compressor to avoid surge. As the pressure ratio further increases due to the evacuation of the adsorbent bed 16, the pressure ratio further increases. However, the feed forward speed multiplier decreases. The reason for this is that the motor and compressor combination will not react immediately due to aerodynamic drag and inertial effects. Consequently, as the pressure ratio increases, the speed of the compressor is gradually increased and after the peak, the speed is gradually decreased to allow the compressor to decelerate and return to peak efficiency so that the next step 1 can take place at which power to the permanent magnet motor is removed.

Figure 5:
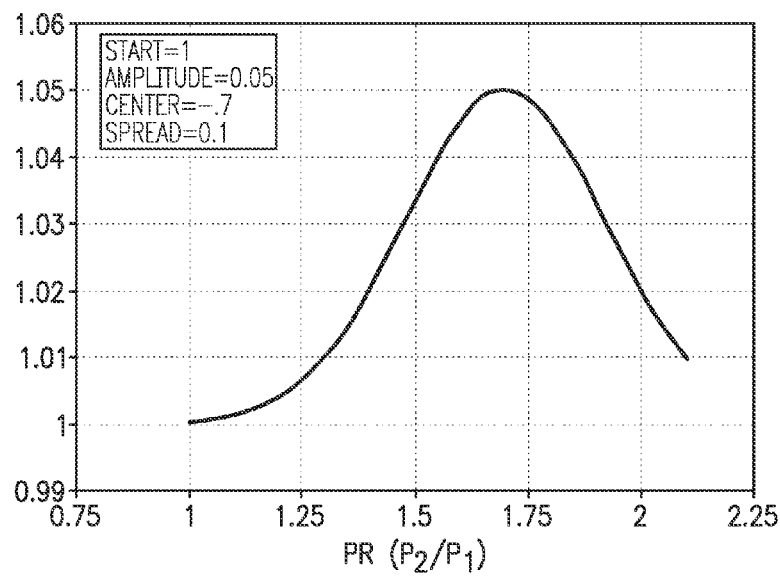
FIG. 5 is a Gaussian curve of a feed forward speed multiplier used in control programming of the controller employed in FIG. 1.

With specific reference to FIG. 5, preferably the response of the feed forward speed multiplier is obtained with a Gaussian function in which the feed forward speed multiplier is given by the equation:

$$\text{START} + \text{Amplitude}^{[F/spread]};$$

where $F=(P_2/P_1-\text{Center})^2$. "Start" will shift the curve shown in FIG. 4 up or down, "Amplitude" will move the peak up or down. "Center" will shift the pressure ratio where the peak occurs and "Spread" controls the rate at which the curve fans out from the center. Thus, the curve itself could be programmed within the control program or data points within a look up table could likewise be programmed. This being said, rather than the illustrated Gaussian curve, the curve could be triangular. Less preferred, but possible, would just be to use the peak of the curve for the feed forward speed multiplier. Likewise, it would be possible to use a fixed factor of increase for the feed back speed multiplier so that the compressor speed would be increased if the flow rate through the compressor dropped below an allowable point and reduced by a fixed factor if the flow rate remained above the allowable point. Why neither of these are preferred is that a greater percentage of operation of the compressor will be off the peak efficiency operating line and therefore, the apparatus 1 will consume more power.

As mentioned above, the programming of the variable frequency drive 40 to remove power at very low speeds is also optional, but as could be appreciated, such operation also saves power. All of the foregoing being said, it is possible to conduct an embodiment of the present invention in which power is never removed from the motor 38. In other words, an embodiment without execution stages 60, 62, 64 and 66. However, if power to the motor were not disabled, then the variable frequency drive 40 will attempt to ramp down the speed along a preprogrammed path by imputing power to the motor 38, thus consuming more power. However, at the very least, the present invention does contemplate programming logic of the type shown in the subsequent logic blocks 68-84 where compressor 12 is at least likely to encounter surge operational conditions, namely, in the present cycle, part of step 2 where pressure ratio across the compressor 12 is rising and thus, power needs to be applied to permanent magnet motor 38, steps 3-4 and steps 6 and 7.

Figure 6:
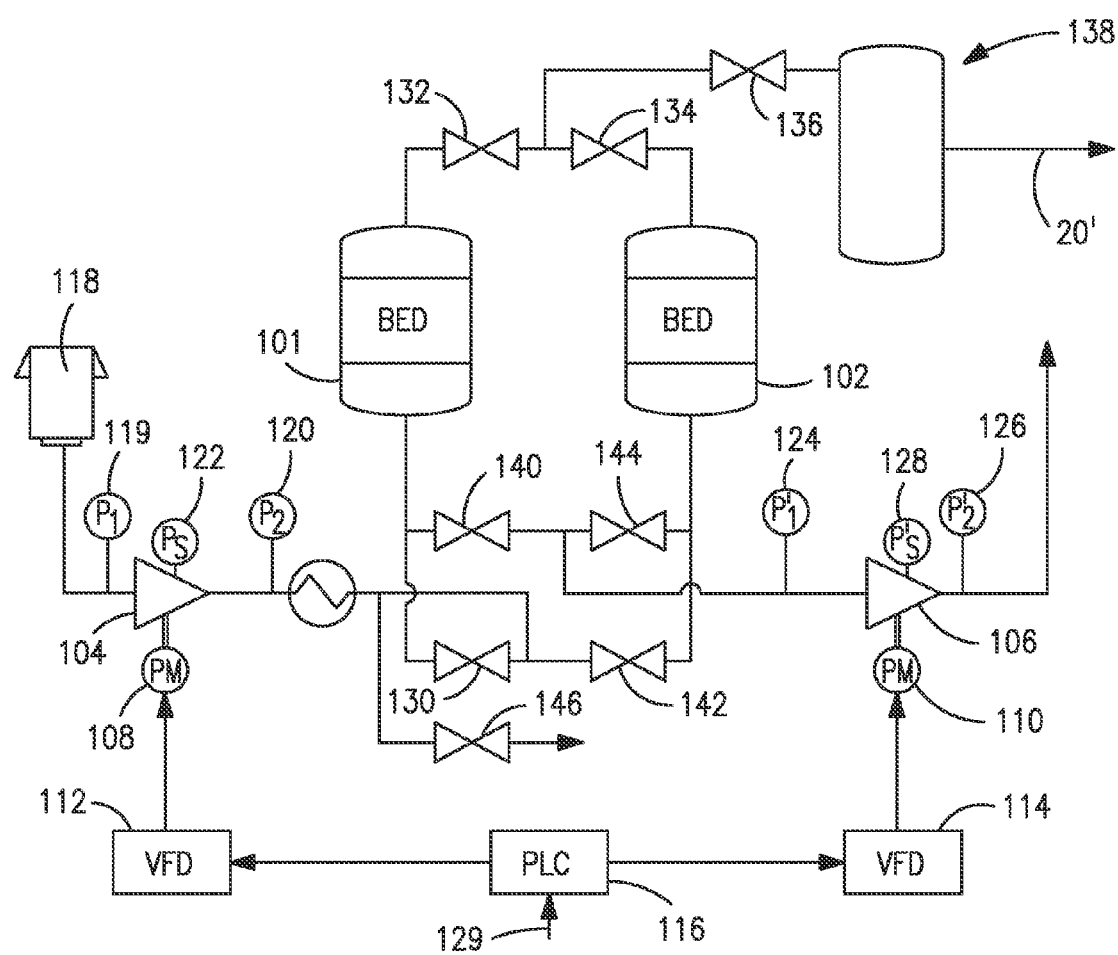
FIG. 6 is a schematic diagram of a vacuum pressure swing adsorption apparatus utilizing dedicated feed and evacuation compressors in connection with adsorbent beds for carrying out a process in accordance with the present invention.

Although, the present invention has been discussed with reference to a vacuum pressure swing adsorption cycle in which a single bed is used and a single centrifugal compressor acts in both feed compression and evacuation roles, the application of the present invention is not limited to such an embodiment. With reference to FIG. 6, an apparatus 2 is illustrated for conducting a vacuum pressure swing adsorption cycle in which two adsorbent beds 101 and 102 are subjected to a twelve step vacuum pressure swing adsorption cycle in which a feed compressor 104 alternately feeds compressed air to the two adsorbent beds 101 and 102 and an evacuation compressor 106 alternately evacuates the adsorbent beds 101 and 102 of gases during such cycle. The feed and evacuation compressors 104 and 106 are driven by variable speed motors 108 and 110, respectively, that are controlled by variable speed drives 112 and 114. The variable speed motors 108 and 110 could be permanent magnet or induction motors. The variable speed drives 112 and 114 control the speed of the motors and are responsive to adjusted speed signals generated by a controller 116. Controller 116 generates the adjusted speed signals and is in turn responsive to signals generated by pressure transducers P1, P2 and PS, designated by reference numbers 118, 120 and 122 in connection with the feed compressor 104 and pressure transducers P'1, P'2, and P'S, designated by reference numbers 124, 126 and 128 in connection with evacuation compressor 106. The electrical connections between the foregoing pressure transducers and the controller 116 has not been shown for purposes of simplifying the explanation of the vacuum pressure swing adsorption cycle employed in connection with apparatus 2. In this regard, controller 116 is also responsive to a signal 129 which indicates to controller 116 the step of the vacuum pressure swing adsorption cycle. An oxygen product stream 20' is produced as a result of such cycle. All of the foregoing elements have a similar description to similarly named elements discussed with respect to apparatus 1. However, the programming of the controller 116, as will be discussed, is modified to reflect the separation of feed and evacuation duties of feed and evacuation compressors 104 and 106.

The vacuum pressure swing adsorption cycle employed in apparatus 2 is one that is disclosed in U.S. Pat. No. 6,010,555 and encompasses operations in which adsorption bed 101 is on-line and producing product and adsorption bed 102 is off-line and is being regenerated. Afterwards in the cycle, adsorption bed 101 is brought off-line and regenerated while adsorption bed is on-line and producing product. It is to be further noted, that unless indicated otherwise, the valves shown in FIG. 6 are set in normally closed positions.

The following is a Table indicating the valve positions during each of the steps in the cycle where "O" indicates an open valve, "C", a closed valve and "P", a partially open valve.

TABLE

| | Steps | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Step Description: | | | | | | | | | | | | |
| Bed 101 | FD, EU | FD, PP | FD | FD, AD | FD, AD, PPG | ED | ED, EV | EV | EV | EV | EV, PG | EV, EU |
| Bed 102 | ED, EV | EV | EV | EV | EV, PG | EV, EU | FD, EU | FD, PP | FD | FD, AD | FD, AD, PPG | ED |
| Valve No.: | | | | | | | | | | | | |
| 140 | C | C | C | C | C | C | O | O | O | O | O | O |
| 130 | O | O | O | O | O | C | C | C | C | C | C | C |
| 144 | O | O | O | O | O | C | C | C | C | C | C | C |
| 142 | C | C | C | C | C | C | O | O | O | O | O | C |
| 146 | C | C | C | C | C | O | C | C | C | C | C | O |
| 132 | O | O | C | O | O | P | P | C | C | C | P | O |
| 134 | P | C | C | C | P | O | O | O | C | O | O | P |
| 136 | C | P | C | O | O | C | C | P | C | O | O | C |

Figure 7:
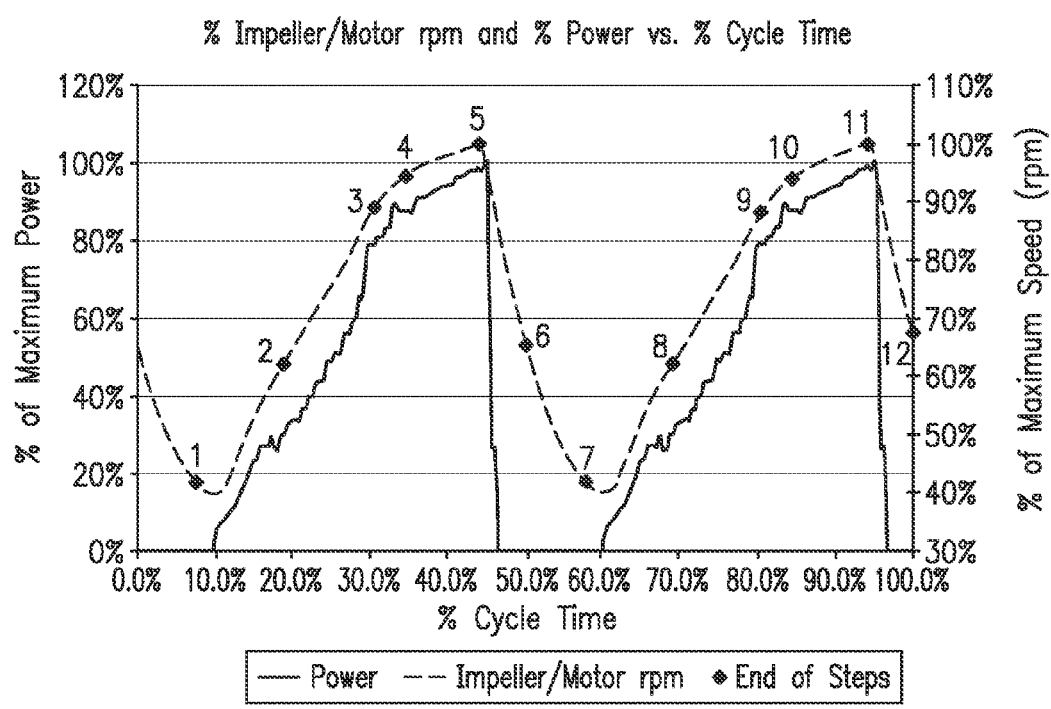
FIG. 7 is an exemplary diagram of the speed and power applied to a motor used in driving the feed compressor used in FIG. 6.

Turning first to the feed steps involving repressurization of adsorbent bed 101, adsorbent bed 101, in a first step, is subjected to a feed with equalization step ("FD,EU") in which filtered air is drawn through inlet 118 and compressed by feed compressor 104 to pressurize the adsorption bed 101 from the bottom with feed air. Simultaneously, equalization gas is delivered from depressurizing adsorption bed 102. For such purposes, valves 130 and 132 are set in open positions and valve 134 is set in a partially open position. In step 2, a feed with product pressurization step ("FD,PP"), valve 134 is closed and valve 136 is set in a partial open position to allow high purity product to be supplied from oxygen surge tank 138. In a subsequent step 3, adsorbent bed 101 continues to be repressurized from the bottom with compressed feed air a raising pressure feed step ("FD"). At this point, valve 130 remains open. Turning to FIG. 7, it can be seen that in step 1, the speed of the feed compressor 104 is falling due to deceleration from a final step. In step 2, the speed first decreases and then increases at the pressure of the adsorbent bed 101 is brought up to operational pressure and in step 3, the speed is increasing as the adsorbent bed 101 is further pressurized. During steps 4 and 5, product is being made and is being delivered to oxygen surge tank 138. In step 4, a constant pressure feed with product make step ("FD,AD") valves 130, 132 and 136 are all set in open positions. At step 5, a combined product make and purge step ("FD,AD, PPG"), valve 134 is additionally set in an open position to allow adsorbent vessel 102 to be purged from the top with product. In step 6, an equalization step ("ED"), power to the feed compressor 104 is removed and as shown in FIG. 7, the compressor 104 therefore decelerates. At this point, valves 130 and 136 are set in closed position and valve 134 is set in an open position to allow accumulated product gas to flow to adsorbent bed 102.

It is to be pointed out that as illustrated in FIG. 7, adsorbent bed 102 is subsequently subjected to feed steps 7-12 that have a one to one correspondence with steps 1-6 for adsorbent bed 101. Additionally, during steps 1-6, adsorbent bed 102 is being regenerated and is therefore, subject to evacuation steps 1-6 shown in FIG. 8 having the same description as evacuation steps 7-12 to be discussed directly below. Also, for purposes of controlling feed compressor 130, where such compressor is a centrifugal compressor, many of the same considerations apply to the control theory of such feed compressor 130 as those discussed with respect to compressor 12 and apparatus 1. Importantly, if FIG. 7 is compared with FIG. 2, it can be seen steps 1 and 7 for apparatus 2 are similar to step 1 for apparatus 1 and steps 6 and 12 for apparatus 2 are similar to step 5 of apparatus 1. In all of such steps, power is not being applied to the compressors, namely, feed compressor 104 of apparatus 2 or compressor 12 of apparatus 1. Additionally, steps 2 and 8, the raising pressure feed with overlap product pressurization steps, speed of compressor 104 first falls and then increases. These steps are similar to step 2 of apparatus 1 with respect to compressor 12. Put another way, the control of feed compressor 104, where such compressor is a centrifugal compressor, such compressor in steps 1 and 7, 6 and 12, and 2 and 8, would be controlled in the same manner as compressor 12 in connection with steps 1, 5 and 2, respectively. Since compressor 104 does not serve as an evacuation compressor, the evacuation steps used in controlling compressor 12 would not be applicable to control of compressor 104.

The adsorbent bed 101 is then regenerated with a falling pressure evacuation and equalization step ("ED,EV") in step 7. During this step, a valve 140 is set in an open position to allow waste nitrogen to be removed from adsorbent bed 101 by action of evacuation compressor 106. Additionally, valve 132 is set in a partially opened position and valve 134 is set in the fully open position for such purposes. A valve 142 is set in an open position to allow adsorbent bed 102 to be fed with compressed air from feed compressor 104. During pure evacuation steps 8, 9 and 10, valve 132 is re-set into the closed position and waste nitrogen continues to be withdrawn from the bottom of adsorbent bed 101 by means of evacuation compressor 106. These are all pure evacuation steps ("EV") where pressure within the adsorbent bed falls. In subsequent step 11, a constant pressure evacuation with product purge step ("EV,PG") adsorbent bed 101 continues to be evacuated by evacuation compressor 106 while being fed from the top with an oxygen purge gas by means of setting valve 132 in a partially opened position. Thereafter, step 12 is conducted which is a raising pressure equalization step ("EV,EU"). During this final step, adsorbent bed 101 continues to be evacuated by evacuation compressor 106 while valve 132 is now set in a fully open position. Valve 146 is set in an open position to allow upstream pressure produced by the feed compressor 104 to vent. Pressure rises because the flow of equalization gas is greater than and at a higher pressure than the gas being drawn by evacuation compressor 106. With additional reference to FIG. 8, it can be seen during steps 7 through 10, the speed of evacuation compressor 106 increases. During step 11, the speed is constant and during step 12, the speed falls as the evacuation compressor 106 is then unpowered. Thereafter, adsorbent bed is subjected to step 1 and the cycle repeats. As mentioned previously, adsorbent bed 102 is subjected to the same feed and evacuation steps with the use of the feed compressor 104 and the evacuation compressor 106. During the evacuation steps 7-12, adsorbent bed 102 is subjected to the feed compression steps mentioned above for adsorbent bed 101. During such steps, the valve positions are as indicated in the Table above.

Figure 2:
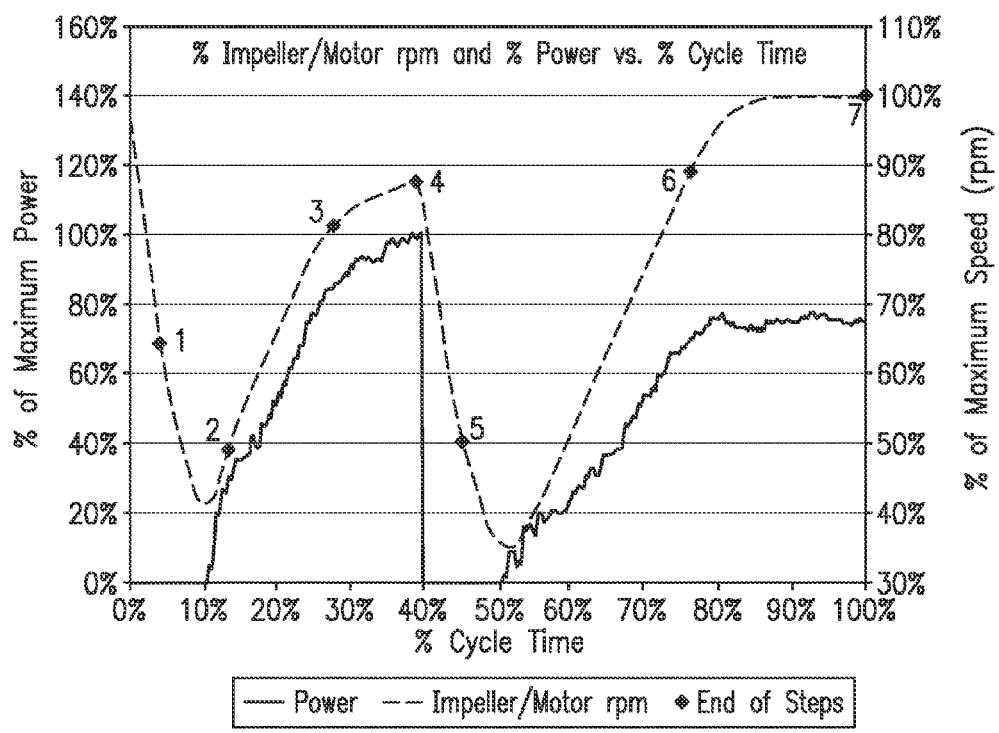
FIG. 2 is an exemplary diagram of the speed and power applied to a motor used in driving a compressor used in FIG. 1.
Figure 8:
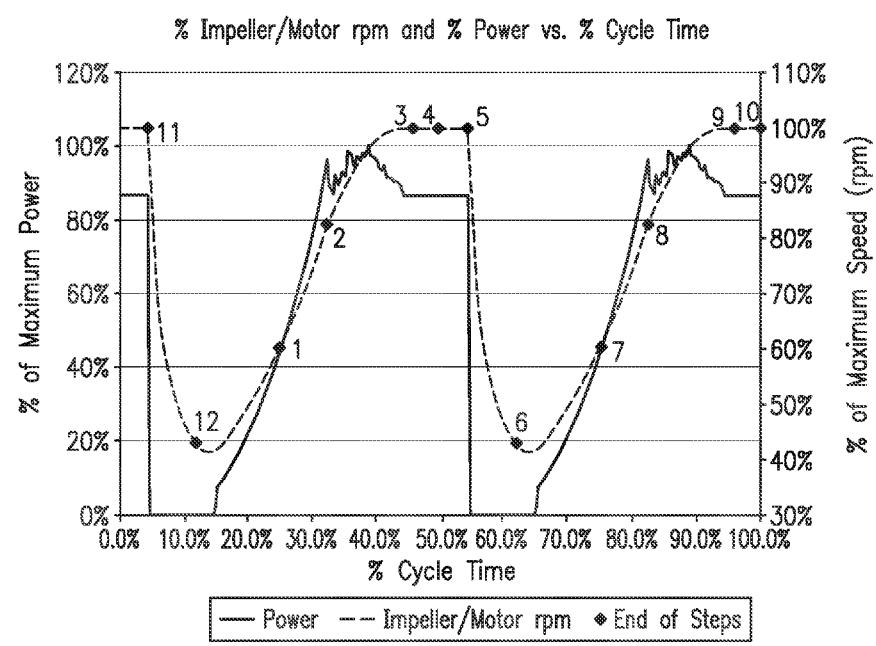
FIG. 8 is an exemplary diagram of the speed and power applied to a motor used in driving the evacuation compressor used in FIG. 6.

Again, if FIG. 8 is compared to FIG. 2, it can be seen that certain control strategies would be common with respect to evacuation compressor 106 and compressor 12. In this regard, steps 6 and 12, are rising pressure equalization steps in which the evacuation compressor 106 is unpowered. During such steps, evacuation compressor 106 would be controlled in the same manner as compressor 12 in steps 1 and 5 discussed above and shown in FIG. 2. Steps 1 and 7 shown in FIG. 8, where the evacuation compressor 106 starts in an unpowered state and then is subsequently powered when pressure ratio across evacuation compressor 106, "P'2/P'1" as measured by pressure transducers 126 and 124, respectively, reaches a predetermined level, would be controlled in a similar manner to that employed for compressor 12 in step 2 shown in FIG. 2. Steps 2, 3, 4; and 8, 9, 10, for evacuation compressor 106 being falling pressure evacuation steps, would be controlled in a similar manner to evacuation step 6 for compressor 12 as shown and described with respect to FIG. 2. Lastly, the constant pressure evacuation with product purge steps 5 and 11 for evacuation compressor 106 would require the same type of control strategy as that employed for compressor 12, step 7 shown and described in reference to FIG. 2.

With specific reference again to FIG. 6, although it is contemplated that both the feed compressor 104 and the evacuation compressor 106 both be centrifugal compressors that are subject to surge, it is possible that the feed compressor 104 be formed by a roots blower. The acceleration and deceleration characteristics of such a compressor would be quite different from those of a centrifugal compressor and such a compressor would not be subject to surge. In such case, feed compressor 104 would not require the surge avoidance control that would be required for a centrifugal compressor. However, evacuation compressor 106 will in any case be a centrifugal compressor and therefore, be subject to surge. In this regard, the control strategy shown for control of the evacuation compressor 106 would in many respects be identical to that shown in FIG. 3 with certain changes related to the actual steps employed in the apparatus shown in FIG. 6. For Example, the calculation and storage of shroud dP set forth in logic block 54 would involve taking a pressure ratio of P'S/P'1 as measured by pressure transducers 128 and 124. Also, the pressure ratio calculated and stored in logic block 56 for use the control algorithm would be the pressure ratio of P'2/P'1 as measured by pressure transducers 126 and 124. The test shown in logic block 60, FIG. 3, would be modified as a test as to whether the step is a raising pressure equalization employed in steps 6 or 12. In either of steps 6 or 12, the speed set to the evacuation compressor 106 is a non-operational speed. As discussed above, this would be the case in either the feed with equalization or the equalization steps 1 and 5 shown in FIG. 2 and employed in apparatus 1. Additionally, logic block 64 would be modified to be a test for the falling pressure evacuation with overlap equalization, or steps 1 and 7 shown in FIG. 7. In such steps, compressor speed decreases and then increases in an analogous manner to step 2, the feed with product pressurization step, shown in FIG. 2. The P2/P1 ratio utilized at 66 would of course be the P'2/P'1 ratio discussed above and the Shroud dP at 68 would be based upon P'S/P'1, as discussed above. The feedback speed multipliers would be calculated in the same manner and for the same reasons as previously described in connection with apparatus 1. Lastly, logic block 74 would be modified to test for the pure evacuation or evacuation with product purge steps or in other words, steps 2, 3, 4 and 5 or steps 8, 9, 10 and 11. In both cases, the feed forward speed multiplier would need to be calculated for similar reasons as set forth in the cycle shown in FIG. 2 and in the same manner.

Where feed compressor 104 is a centrifugal compressor, it also will be somewhat controlled in the same manner as compressor 12. However, feed compressor 104, unlike compressor 12, never serves as an evacuation compressor. As such, logical steps noted by reference number 74, 76, 78 and 80 in FIG. 3 can be dispensed with in that a feed forward speed multiplier will never be used. Additionally, the calculation and storage of Shroud dP shown in logic block 54 would be computed by taking a ratio of PS/P1 as measured by pressure transducers 122 and 118. The pressure ratio P2/P1 calculated and stored at 56 would be measured by pressure transducers 120 and 118. As mentioned above with respect to steps 1, 7; and 6, 12, shown in FIG. 7, feed compressor 104 is in an unpowered state. As such logic block 60 would be replaced with a test for such steps or whether the specific step was a falling pressure equalization step or a rising pressure feed with overlap equalization step. Steps 2 and 8 shown in FIG. 7 relating to the raising pressure feed with overlap product pressure steps are similar to step 2 of FIG. 2, the feed with product pressurization step of Apparatus 1. As such, logic block 64 would be replaced by a test as to whether the step was a raising pressure feed with overlap product pressure step. Since a feed forward multiplier will never need to be calculated the optimal speed that will be set in variable frequency drive 112 will be the optimal speed multiplied by the feedback speed multiplier calculated in the same manner and with the same reasoning as that calculated for compressor 12 of apparatus 1 in the cycle discussed above.

While the present invention has been described with reference to a preferred embodiment as will occur to those skilled in the art, numerous, changes, additions and omission can be made without departing from the spirit and scope of the invention as set forth in the appended claims.

We claim:

1. A method of controlling centrifugal compressor speed within a vacuum pressure swing adsorption apparatus, said centrifugal compressor having an inlet configured to receive an air feed stream and an outlet configured to discharge a pressurized air feed stream, said method comprising:

measuring or calculating the flow rate of said air feed stream entering the inlet of said centrifugal compressor the centrifugal compressor directly driven by an electric motor having a speed controlled by a variable frequency drive;

measuring the pressure of the pressurized air feed stream at the outlet of said compressor and the pressure of said air feed stream at the inlet of said compressor and calculating the pressure ratio of pressures of the outlet to the inlet of the centrifugal compressor;

determining an optimal speed of the centrifugal compressor based on the pressure ratio that lies along the peak efficiency operating line of the centrifugal compressor;

determining a minimum allowable value of a parameter at which surge conditions can occur at the optimal speed, wherein said parameter is referable to the flow rate of the air feed stream passing through the centrifugal compressor;

determining a feed back multiplier that when multiplied by the optimal speed will either increase the speed when the parameter is less than the minimum allowable value or will reduce the speed when the parameter is greater than or equal to the minimum value;

during steps of a repeating cycle conducted by the vacuum pressure swing adsorption apparatus while maintaining the optimal speed of the centrifugal compressor other than a pure evacuation step and an evacuation with product purge step thereof, setting a total speed multiplier equal to the feed back multiplier;

during the pure evacuation step and the evacuation with product purge step, calculating the total speed multiplier by multiplying the feed back multiplier by a feed forward multiplier that will increase the speed during the pure evacuation step and the evacuation with product purge step in order to maintain optimal speed of the centrifugal compressor;

calculating an adjusted speed by multiplying the optimal speed by the total speed multiplier; and generating a control signal referable at least to the adjusted speed and inputting the control signal into the variable frequency drive such that the electric motor and therefore, the centrifugal compressor operates at the adjusted speed.

2. The method of claim 1, wherein:

the vacuum pressure swing adsorption process utilizes a feed compressor for feeding compressed gas to adsorption beds of the vacuum pressure swing adsorption apparatus and an evacuation compressor for evacuating gases from the adsorption beds; wherein said evacuation compressor is a centrifugal compressor.

3. The method of claim 1, wherein:

the vacuum pressure swing adsorption process uses a single compressor to feed compressed gas to an adsorbent bed and to evacuate gases from the adsorbent bed;

the repeating cycle includes a feed with equalization step subsequent to the evacuation with product purge step, a feed with product repressurization step following the feed with equalization step and an equalization step prior to the pure evacuation step; and during the feed with equalization step, the equalization step and initiation of the feed with product repressurizaton step, the control signal is referable to a non-operational speed such that when the control signal is inputted into the variable frequency drive, electrical power is not applied to the electric motor; and when a predetermined pressure ratio is obtained during the feed with product repressurization step, the control signal is again referable to the adjusted speed such that the electric motor and therefore, the compressor operates at the adjusted speed.

4. The method of claim 2, wherein:

the repeating cycle includes a falling pressure equalization step and a rising pressure equalization step subsequent to the evacuation with product purge step;

during the falling pressure equalization step and the rising pressure equalization step, the control signal is referable to a non-operational speed such that electrical power is not applied to the electric motor driving with the evacuation compressor; and when a predetermined pressure ratio is obtained during the falling pressure equalization step, the control signal is again referable to the adjusted speed such that the evacuation compressor operates at the adjusted speed.

5. The method of claim 1 or claim 2, wherein:

each time the feed back multiplier is determined, the feed back multiplier is stored;

when the parameter is less than the minimum allowable value, the feed back multiplier is determined by adding to a last stored value of the feed back multiplier a speed correction factor; and when the parameter is greater than or equal to the minimum allowable value, the feed back multiplier is calculated by dividing the last stored value of the feed back multiplier by a proportionality constant, the proportionality constant set equal to a value greater than 1.0 when the last stored value of the feed back multiplier is greater than or equal to 1.0 or 1.0 when the last stored value of the feed back multiplier is less than 1.0.

6. The method of claim 1 or claim 2, wherein:

the feed forward multiplier is a function of the pressure ratio;

the function having a maximum value of the feed forward multiplier at a predetermined pressure ratio at which or directly before which the surge conditions occur during a transition between the pure evacuation step and the evacuation with product purge step and decreasing values of the feed forward multiplier at pressure ratios greater than or less than maximum value; and the maximum valve has a magnitude preselected such that when the maximum value is multiplied by the optimal speed at the predetermined pressure ratio the resulting speed will prevent surge conditions from occurring.

7. The method of claim 6, wherein the function is a Gaussian function.

8. The method of claim 1 or claim 2, wherein the parameter is the flow rate of the air feed stream passing through the centrifugal compressor, which is directly measured by a flow transducer, or is determined by measuring the pressure difference measured at two points in a shroud of the centrifugal compressor and that are successively closer to an impeller thereof.

9. The method of claim 5, wherein:

the parameter is a pressure difference measured at two points in the shroud of the centrifugal compressor that are successively closer to an impeller thereof;

wherein a pressure difference error is calculated and stored by subtracting the minimum allowable value from the a current value of the pressure difference; and the speed correction factor of the feed back multiplier is calculated during each of the time intervals through proportional integral control comprising adding a proportional term to an integral term, the proportional term calculated by multiplying a gain factor by a difference between the pressure difference error and a prior pressure difference error calculated in a prior time interval and dividing the difference by the time interval and the integral term calculated by dividing the gain factor by an integral reset time and multiplying a resultant quotient thereof by the pressure difference error.

10. The method of claim 8, wherein:
the feed forward multiplier is a Gaussian function of the pressure ratio;
the Gaussian function having a maximum value of the feed forward multiplier at a predetermined pressure ratio at which or directly before which the centrifugal compressor enters surge conditions during a transition between the evacuation step and the purge step and decreasing values of the feed forward multiplier at pressure ratios greater than or less than maximum value; and
the maximum valve has a magnitude preselected such that when the maximum value is multiplied by the optimal speed at the predetermined pressure ratio the resulting speed will prevent the centrifugal compressor from entering surge conditions.

11. A control system for controlling centrifugal compressor speed within a vacuum pressure swing adsorption apparatus, said control system comprising:
flow transducers for determining the flow rate of gas entering a centrifugal compressor directly driven by an electric motor having a speed controlled by a variable frequency drive;
pressure transducers positioned to sense pressure at an inlet and an outlet of the centrifugal compressor;
a controller responsive to the flow and pressure transducers and steps of a repeating cycle conducted by the vacuum pressure swing adsorption apparatus and having a control program programmed to:
calculate a pressure ratio of the pressures of the outlet to inlet of the centrifugal compressor;
determine an optimal speed of the centrifugal compressor based on the pressure ratio that lies along the peak efficiency operating line of the centrifugal compressor;
determine a minimum allowable value of a parameter at which surge conditions occur at the optimal speed, wherein said parameter is the flow rate of the air feed stream passing through the centrifugal compressor;
determine a feed back multiplier that when multiplied by the optimal speed will either increase the speed when the parameter is less than the minimum allowable value or will reduce the speed when the parameter is greater than or equal to the minimum allowable value;
set a total speed multiplier equal to the feed back multiplier during the steps of the repeating cycle while maintaining the optimal speed of the centrifugal compressor, other than a pure evacuation step and an evacuation with product purge step thereof;
set the total speed multiplier equal to a mathematical product of the feed back multiplier and a feed forward multiplier during the pure evacuation step and the evacuation with product purge step, that will increase the speed such that centrifugal compressor is not likely to enter the surge conditions; and
calculate an adjusted speed by multiplying the optimal speed by the total speed multiplier; and
the controller configured to generate a control signal in response to the control program and able to serve as an input into the variable frequency drive such that speed of the electric motor and therefore, the centrifugal compressor is controlled in response to the control signal, the control signal referable at least to the adjusted speed such that the electric motor and therefore, the centrifugal compressor operates at the adjusted speed.

12. The control system of claim 11, wherein:
the vacuum pressure swing adsorption apparatus utilizes a feed compressor for feeding compressed gas to adsorption beds of the vacuum pressure swing adsorption apparatus and an evacuation compressor for evacuating gases from the adsorption beds; wherein said evacuation compressor is a centrifugal compressor.

13. The control system of claim 11, wherein:
the vacuum pressure swing adsorption apparatus uses a single compressor to feed compressed gas to an adsorbent bed and to evacuate gases from the adsorbent bed;
the repeating cycle includes a feed with equalization step subsequent to the evacuation with product purge step, a feed with product repressurization step following the feed with equalization step and an equalization step prior to the pure evacuation step;
the control program is programmed to produce a non-operational speed at which the variable frequency drive will remove electrical power from the electric motor and the control signal is referable to the non-operational speed when produced by the control program;
during the feed with equalization step, the equalization step and initiation of the feed with product repressurizaton step, the control program produces the non-operational speed such that when the control signal is inputted into the variable frequency drive, electrical power is not applied to the electric motor; and
the control program also programmed such that when a predetermined pressure ratio of the pressure ratio is obtained during the feed with product repressurization step, the control signal is again referable to the adjusted speed such that the electric motor and therefore, the compressor operates at the adjusted speed.

14. The control system of claim 12, wherein:
the repeating cycle includes a falling pressure equalization step and a rising pressure equalization step subsequent to the evacuation with purge step;
the control program is programmed to produce a non-operational speed at which the variable frequency drive will remove electrical power from the electric motor and the control signal is referable to the non-operational speed when produced by the control program;
during the falling pressure equalization step and the rising pressure equalization step, the control program produces the non-operational speed such that when the control signal is inputted into the variable frequency drive, electrical power is not applied to the electric motor driving the evacuation compressor; and the control program also programmed such that when a predetermined pressure ratio of the pressure ratio is obtained during the falling pressure equalization step, the control signal is again referable to the adjusted speed such that the electric motor and therefore, the evacuation compressor operates at the adjusted speed.

15. The control system of claim 11 or claim 12, wherein the control program is programmed such that:
each time the feed back multiplier is determined, the feed back multiplier is stored;
when the parameter is less than the minimum allowable value, the feed back multiplier is determined by adding to a last stored value of the feed back multiplier a speed correction factor; and when the parameter is greater than or equal to the minimum allowable value, the feed back multiplier is determined by dividing the last stored value of the feed back multiplier by a proportionality constant, the proportionality constant set equal to a value greater than 1.0 when the last stored value of the feed back multiplier is greater than or equal to 1.0 or 1.0 when the last stored value of the feed back multiplier is less than 1.0.

16. The control system of claim 11 or claim 12, wherein the control program is programmed such that:
the feed forward multiplier is a function of the pressure ratio;
the function having a maximum value of the feed forward multiplier at a predetermined pressure ratio at which or directly before which the centrifugal compressor enters surge conditions during a transition between the pure evacuation step and the evacuation with product purge step and decreasing values of the feed forward multiplier at pressure ratios greater than or less than maximum value; and
the maximum valve has a magnitude preselected such that when the maximum value is multiplied by the optimal speed at the predetermined pressure ratio the resulting speed will prevent the centrifugal compressor from entering surge conditions.

17. The control system of claim 16, wherein the function is a Gaussian function.

18. The control system of claim 11 or claim 12, wherein:
the flow rate of the air feed stream passing through the centrifugal compressor is directly measured by a flow transducer or is measured by two further pressure transducers situated at two points in the shroud of the centrifugal compressor that are successively closer to an impeller thereof;
the control program is programmed to calculate a pressure difference from pressure measured by the two further pressure transducers; and
the parameter is the pressure difference.

19. The control system of claim 15, wherein:
the flow rate of the air feed stream passing through the centrifugal compressor is determined by two further pressure transducers situated at two points in the shroud of the centrifugal compressor that are successively closer to an impeller thereof;
the control program is programmed to calculate a pressure difference from pressure measured by the two further pressure transducers;
the parameter is the pressure difference; and
the control program is programmed such that;
a pressure difference error is calculated and stored by subtracting the minimum allowable value from the a current value of the pressure difference; and
the speed correction factor of the feed back multiplier is calculated during each of the time intervals through proportional integral control comprising adding a proportional term to an integral term, the proportional term calculated by multiplying a gain factor by a difference between the pressure difference error and a prior pressure difference error calculated in a prior time interval and dividing the difference by the time interval and the integral term calculated by dividing the gain factor by an integral reset time and multiplying a resultant quotient thereof by the pressure difference error.

20. The control system of claim 19, wherein the control program is programmed such that:
the feed forward multiplier is a Gaussian function of the pressure ratio;
the Gaussian function having a maximum value of the feed forward multiplier at a predetermined pressure ratio at which or directly before which the centrifugal compressor enters surge conditions during a transition between the evacuation step and the purge step and decreasing values of the feed forward multiplier at pressure ratios greater than or less than maximum value; and
the maximum value has a magnitude preselected such that when the maximum value is multiplied by the optimal speed at the predetermined pressure ratio the resulting speed will prevent the centrifugal compressor from entering surge conditions.

* * * * *